(12) United States Patent
Hanby

(10) Patent No.: US 6,390,134 B1
(45) Date of Patent: May 21, 2002

(54) APPARATUS AND METHOD FOR PREVENTING GAS-SURGE IN A WELDING GAS DELIVERY SYSTEM

(76) Inventor: Stephen K. Hanby, 2326 Perkins St. NE., Salem, OR (US) 97303

( * ) Notice: Subject to any disclaimer, the term of this patent is extended or adjusted under 35 U.S.C. 154(b) by 0 days.

(21) Appl. No.: 09/828,637

(22) Filed: Apr. 6, 2001

(51) Int. Cl.[7] .................................................. F15D 1/02
(52) U.S. Cl. ............................. 138/44; 138/45; 138/46
(58) Field of Search ................................ 138/44, 45, 46

(56) References Cited

U.S. PATENT DOCUMENTS

| | | | | |
|---|---|---|---|---|
| 4,341,237 A | | 7/1982 | Stauffer | 137/382.5 |
| 4,426,213 A | * | 1/1984 | Stavropoulos | 138/41 |
| 4,644,974 A | * | 2/1987 | Zingg | 138/44 |
| 4,958,658 A | | 9/1990 | Zajac | 137/613 |
| 5,060,686 A | * | 10/1991 | Troy | 138/44 X |
| 5,123,452 A | * | 6/1992 | LeBlanc | 138/44 |
| 5,315,859 A | * | 5/1994 | Schommer | 138/44 X |
| 5,653,264 A | * | 8/1997 | Atkinson | 138/44 |
| 5,676,719 A | * | 10/1997 | Stavropoulos et al. | 138/41 X |
| 5,893,273 A | * | 4/1999 | Casiraghi | 138/44 X |

* cited by examiner

Primary Examiner—Patrick Brinson
(74) Attorney, Agent, or Firm—Carl D. Crowell

(57) ABSTRACT

A method and apparatus for reducing the amount of gas consumed during welding operations by reducing gas-surge principally for M.I.G. and T.I.G. welding systems. A preferred embodiment consists of a series of removable orifice bodies which may be threaded into a valve body. The removable orifice bodies restrict the maximum rate at which gas can flow from through the welding system. Gas-flow cannot exceed the maximum rate permitted by the particular diameter of the removable orifice body used, but may be adjusted up or down by substituting one of a plurality of available interchangeable orifice bodies. To allow for a higher gas flow rate, an orifice body with a larger diameter gas flow passage is used. For a lower gas flow rate, an orifice body with a smaller gas flow passage is used.

2 Claims, 3 Drawing Sheets

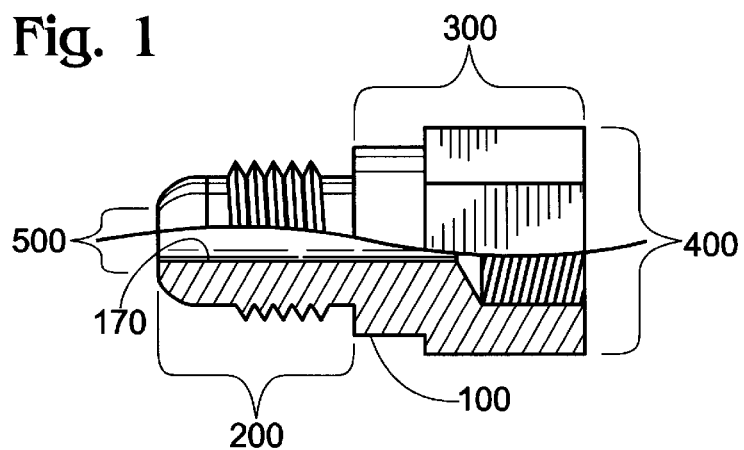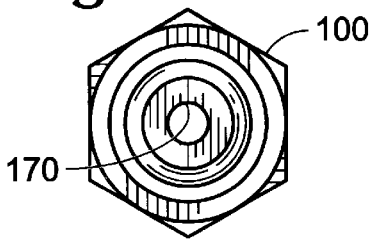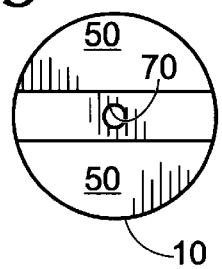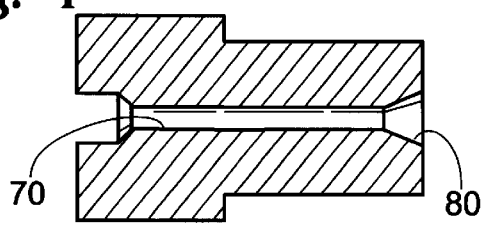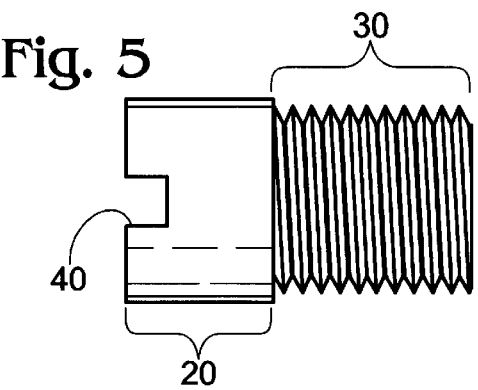

APPARATUS AND METHOD FOR PREVENTING GAS-SURGE IN A WELDING GAS DELIVERY SYSTEM

BACKGROUND OF THE INVENTION

The present invention relates to a method and apparatus for reducing the amount of gas consumed during welding operations. More particularly, the invention relates to preventing gas-surge in M.I.G. and T.I.G. welding systems and improving the arc starting characteristics of welding equipment.

A typical gas delivery system conducts compressed gas from a high-pressure cylinder, through a hose, to a welding machine. The rate at which gas flows through the system is affected by the relationship between a flowmeter, often connected directly to a cylinder or a manifold system and a valve switch at the welding apparatus in use, often comprised of a solenoid. To maintain availability of gas throughout the system, the regulator used will reduce the pressure available at the solenoid, however, pressure will still be greater than needed for actual welding to ensure that there is a regular gas flow. In addition the hoses used to transport gas are often flexible and will expand when held under pressure increasing the volume and pressure of gas between the flowmeter and the solenoid. The higher static pressure is discharged on initial releases of gas for use. This discharge creates a short term gas-surge or large flow of gas due to the build up of the high static pressure within the line. The amount of gas exhausted is far greater than the amount needed under transient welding conditions and is disruptive to the welding process.

Gas-surge wastes valuable inert welding gas. Welding operations cannot begin until the gas-surge has passed and gas-flow rate has normalized. The amount of actual surge is affected by variables such as the condition of the rubber hose, the hose length, and the ambient air temperature. Whatever the amount, gas surge is a persistent problem in the welding industry wasting time and money.

Prior art devices which have addressed this problem have failed to provide a satisfactory solution. U.S. Pat. No. 4,341,237 to Stauffer teaches an apparatus for reducing the waste of welding gas by temporarily storing gas in a surge tank and thereafter dispensing gas at a uniform rate. The limitations of this device are readily apparent. The device is bulky, consumes a significant amount space, is heavy, and not substantially portable. The Stauffer device also has a plurality of moving parts which are subject to breakage, and are expensive to assemble and repair.

Other known prior art consists of variable restrictions in the form of sliding occlusions that create a variable size barrier to glass flow at the welding apparatus. In their simplest form, these systems are essentially adjustable valves that gate off gas flow. A problem with these systems is that the adjustable valve and gate orifices are not of a uniform shape and size, often with hard angular edges causing turbulence in the gas flow. These types of adjustable valve and gate systems are also expensive, cumbersome and prone to blockage or failure. Another defect of the valve and gate flow limitation systems is that the exact flow rate created is difficult to gauge and often unknown and must be reset and adjusted on a regular basis.

The present invention solves the problems of gas-surge while avoiding the shortcomings inherent in prior art devices. A preferred embodiment of the present invention consists of a series of removable orifice bodies with a gas-flow passage which is inserted into a valve body which has two ends. One end of the valve body containing the orifice body is connected to the gas inlet side of the solenoid of a welding unit. The hose used to transport gas to the solenoid is then attached to the second end of the valve body. The gas-flow channel of the orifice body restricts the maximum rate at which gas can flow from the hose into the solenoid. Gas-flow may be set to any level below the maximum threshold by adjusting the flowmeter; just as in normal welding operations. But gas-flow through the solenoid cannot exceed the maximum rate permitted by the particular diameter of the gas-flow passage of the orifice body.

The benefit of the invention is that maximum gas-flow rate may be adjusted up or down by substituting one of a plurality of interchangeable orifice bodies. Each orifice body may be removably inserted into the valve body and each orifice body contains a specific gas-flow passage of a specific size. To allow flow at a higher rate, an orifice body with a larger diameter gas-flow passage is installed. When conditions call for a lower flow rate, an orifice body with a smaller gas-flow passage is used. The use of precision set diameter chamfered nozzles for the gas entering and exiting the gas-flow passage permits gas to flow at a steady rate without excessive turbulence. The use of the invention also provides an inexpensive device and method for variably setting a known maximum gas flow rate to a solenoid in a welding apparatus.

BRIEF DESCRIPTION OF THE DRAWINGS

FIG. 1 is a partially sectional side view of the valve body.

FIG. 2 is a frontal view of the valve body.

FIG. 3 is a frontal view of the orifice body.

FIG. 4 is a side cross-sectional view of the orifice body.

FIG. 5 is a side view of the orifice body.

DESCRIPTION OF THE PREFERRED EMBODIMENT

Figure 6:
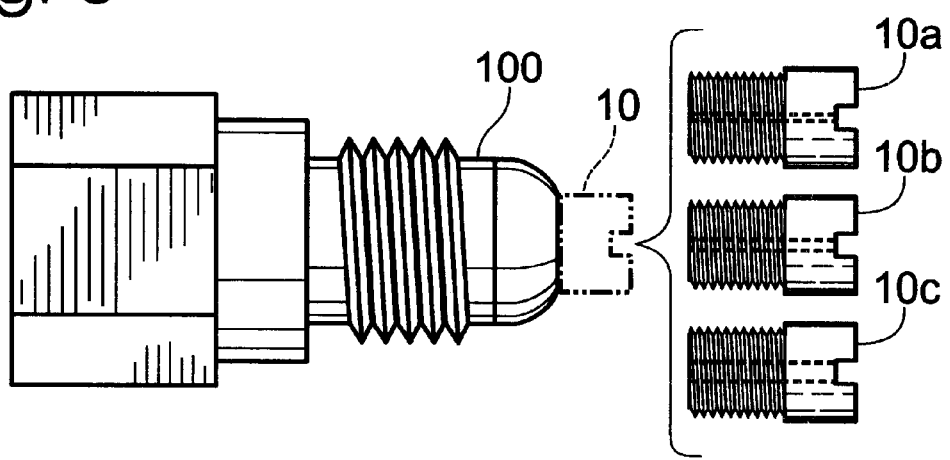
FIG. 6 is an illustration of the invention depicting the interchangable elements therein.

In a preferred embodiment, the orifice body 10 as shown in FIGS. 3–5, is substantially cylindrical, with a threaded first end 30 and non-threaded second end 20. In a preferred embodiment, the orifice body head 20 is of larger diameter than the diameter of an orifice body base 30.

The orifice body head 20 has a transverse slot 40 dividing the face 50 of the orifice body head 20 medially into halves. The slot 40 is used to permit a screwdriver or similar tool to rotateably drive or remove the orifice body 10 into the valve body 100, pictured in FIGS. 1 and 2. Punctuating the center of the face 50 of the orifice body head 20, and at the base of the slot 40, is situated a gas-flow passage 70 having a distinct diameter. The gas-flow passage 70 is axially disposed through orifice body 10. In a preferred embodiment, the distinct diameter of the gas-flow passage 70 may be larger or smaller for a particular orifice body 10 and the orifice-body gas-flow passage 70 is chamfered 80.

FIGS. 1–2 depict preferred embodiment views of the valve body element 100 of the invention having a first end 300, a second end 200, and a valve-body gas flow passage 170. The valve-body gas-flow passage 170 is axially disposed through the valve body 100. The orifice body 10 is removably seated within an end 200 of the valve-body gas-flow passage 170 of the valve body 100.

The valve body 100 is divided into a male half 200, and a female half 300. The male half 200 is substantially cylindrical and is externally threaded to permit attachment to a solenoid containing welding apparatus (not pictured) or other device. The valve-body gas-flow passage 170 within the male half 200 is internally threaded to removably receive the orifice body threaded end 30. The female half 300 is substantially hexagonal in shape conforming to the shape and size of standard welding fittings. The valve-body gas flow passage 170 within the female half 300 is internally threaded to receive a standard hose-connecting assembly (not pictured) or other device.

In a preferred embodiment, a plurality of interchangeable, removable orifice bodies 10a, 10b, 10c may be interchangeably seated within the valve-body 100 gas-flow passage 170, as depicted in FIG. 6. In a preferred embodiment, the each of the interchangeable, removable orifice bodies 10a, 10b, 10c has an orifice-body gas-flow passage 70 of different distinct diameter permitting a set volume of gas flow.

Figure 7:
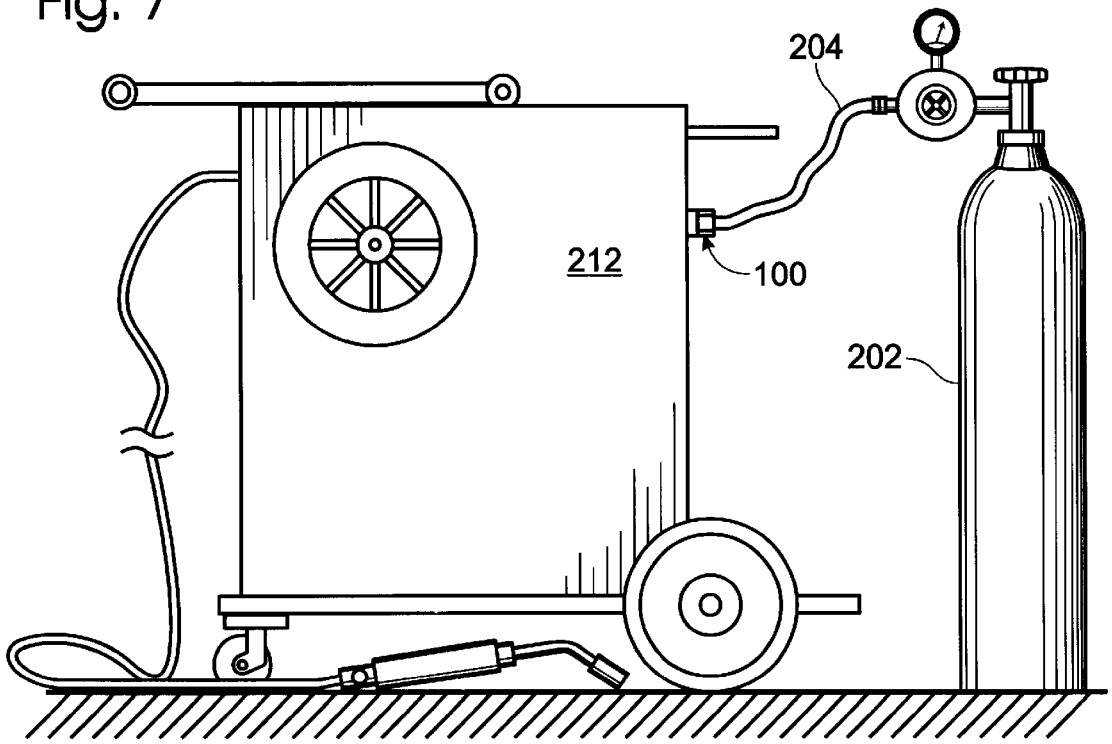
FIG. 7 is an illustration of a gas welding unit with gas source, torch and the invention.
Figure 8:
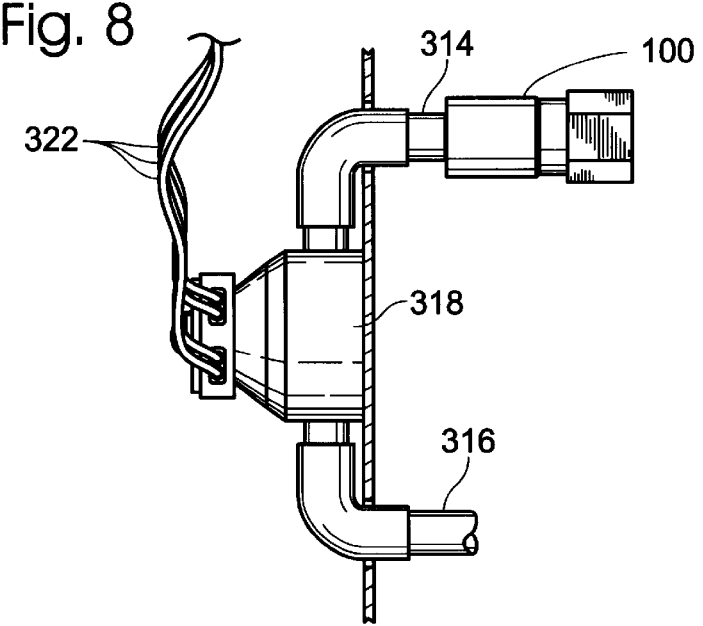
FIG. 8 is a detail illustration of the solenoid of a welding unit with the principal element of the invention in place.

The valve body 100 is placed between the gas source 202 and a welding torch at the end of a transport hose 204 affixed to the gas intake of a solenoid 210 in a MIG or TIG welding unit 212 as shown in FIGS. 7 and 8. FIG. 8 is a detailed solenoid 318 with the valve body in place on the solenoid input 314. Also depicted for clarification, the solenoid output 316 and control wires 322.

To those skilled in the art, other variations of this invention will be apparent, including changes and modifications. Such changes and modifications may be carried out without departing from the scope of this invention, which is intended to be limited only by the scope of the claims below.

I claim:

1. An apparatus for use in controlling gas surge in a gas welding system comprising:
   a valve-body having a first valve-body end, a second valve-body end, and a valve-body gas-flow passage,
   said valve-body disposed between a solenoid on a welding unit and a gas transport hose of a gas source,
   wherein said valve-body gas-flow passage connects said first valve-body end and said second valve-body end;
   an orifice body having an orifice-body head, an orifice-body base, and an orifice body gas-flow passage having a distinct diameter;
   wherein said orifice-body gas-flow passage connects said orifice-body head and said orifice-body base;
   wherein said valve-body gas-flow passage is adapted to removably receive said orifice body;
   wherein said orifice-body gas-flow passage, and said valve-body gas-flow passage are operatively connected.

2. The apparatus of claim 1 further comprising a plurality of interchangeable orifice bodies;
   wherein said orifice-body gas-flow passage of each said interchangable orifice bodies has a different distinct diameter;
   wherein said valve body is adapted to individually removably receive each of said interchangeable orifice bodies.

* * * * *